(12) United States Patent
Barone et al.

(10) Patent No.: US 11,173,908 B2
(45) Date of Patent: Nov. 16, 2021

(54) METHOD TO CONTROL A ROAD VEHICLE PROVIDED WITH A DUAL-CLUTCH, SERVO-ASSISTED TRANSMISSION AND STANDING STILL WITH THE INTERNAL COMBUSTION ENGINE TURNED ON

(71) Applicant: FERRARI S.p.A., Modena (IT)

(72) Inventors: Alessandro Barone, Bologna (IT); Andrea Nannini, Modena (IT); Giacomo Senserini, Modena (IT); Stefano Marconi, Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 17/015,351

(22) Filed: Sep. 9, 2020

(65) Prior Publication Data

US 2021/0094545 A1    Apr. 1, 2021

(30) Foreign Application Priority Data

Sep. 30, 2019 (IT) .................. 102019000017504

(51) Int. Cl.
*B60W 30/18* (2012.01)
*B60W 10/02* (2006.01)
(Continued)

(52) U.S. Cl.
CPC ...... *B60W 30/18054* (2013.01); *B60W 10/02* (2013.01); *B60W 10/10* (2013.01);
(Continued)

(58) Field of Classification Search
CPC .... B60W 10/02; B60W 10/06; B60W 10/113; B60W 10/10; B60W 30/18054;
(Continued)

(56) References Cited

U.S. PATENT DOCUMENTS

2011/0139563 A1* 6/2011 Kang .................. B60W 10/02
                                                                    192/3.54
2011/0284336 A1   11/2011 Soller et al.
(Continued)

FOREIGN PATENT DOCUMENTS

DE      102007056767 A1    5/2009

OTHER PUBLICATIONS

Search Report issued in Italian Patent Application No. 201900017504, date of completion: Mar. 24, 2020; 8 pages.

*Primary Examiner* — Edwin A Young
(74) *Attorney, Agent, or Firm* — Cantor Colburn LLP

(57) ABSTRACT

A method to control a road vehicle provided with a dual-clutch, servo-assisted transmission and standing still with the internal combustion engine turned on; the control method generally includes, when the road vehicle is standing still with the internal combustion engine turned on, the steps of: engaging a forward gear associated with a first clutch; engaging a reverse gear associated with a second clutch, which is different from and independent of the first clutch; closing the first clutch so as to cause the first clutch to transmit a first torque; and closing the second clutch so as to cause the second clutch to transmit a second torque, which is equal to the first torque multiplied by the quotient between a gear ratio of the reverse gear and a gear ratio of the forward gear.

12 Claims, 4 Drawing Sheets

(51) Int. Cl.
*B60W 10/10* (2012.01)
*F16D 25/10* (2006.01)
(52) U.S. Cl.
CPC ....... *F16D 25/10* (2013.01); *B60W 2510/104* (2013.01); *B60W 2510/1005* (2013.01); *B60W 2530/00* (2013.01); *F16D 2300/00* (2013.01)
(58) Field of Classification Search
CPC ........... B60W 30/20; B60W 2030/203; B60W 2030/206; B60W 2510/1065; B60W 2510/104; B60W 2520/04; B60W 2530/00; F16D 25/10; F16D 2300/00
See application file for complete search history.

(56) References Cited

U.S. PATENT DOCUMENTS

| | | | | |
|---|---|---|---|---|
| 2015/0012191 A1* | 1/2015 | Ohya | ........................ | B60K 6/48 |
| | | | | 701/53 |
| 2019/0143813 A1* | 5/2019 | Ono | ...................... | F02D 41/042 |
| | | | | 477/71 |

* cited by examiner

METHOD TO CONTROL A ROAD VEHICLE PROVIDED WITH A DUAL-CLUTCH, SERVO-ASSISTED TRANSMISSION AND STANDING STILL WITH THE INTERNAL COMBUSTION ENGINE TURNED ON

CROSS-REFERENCE TO RELATED APPLICATIONS

This patent application claims priority from Italian patent application no. 102019000017504 filed on Sep. 30, 2019, the entire disclosure of which is incorporated herein by reference.

TECHNICAL FIELD

The invention relates to a method to control a road vehicle provided with a dual-clutch, servo-assisted transmission and standing still with the internal combustion engine turned on.

PRIOR ART

A drivetrain provided with a dual-clutch, servo-assisted transmission comprises a pair of primary shafts, which are coaxial to one another, are independent of one another and are inserted inside one another; two coaxial clutches, each designed to connect a respective primary shaft to a drive shaft of an internal combustion engine; and at least one secondary shaft, which transmits the motion to the drive wheels and can be coupled to the primary shafts by means of respective gear trains, each defining a gear.

During a gear shift, the current gear couples the secondary shaft to a primary shaft, while the following gear couples the secondary shaft to the other primary shaft; as a consequence, the gear shift takes place by crossing the two clutches, namely by opening the clutch associated with the current gear and by simultaneously closing the clutch associated with the following gear.

When the road vehicle is standing still with the internal combustion engine turned on (for example, immediately after having turned on the internal combustion engine or, more frequently, during standstills caused by traffic), the internal combustion engine has a very low rotation speed (namely, it "idles") and can feature combustion irregularities (especially when the internal combustion engine is designed to generate a very large maximum power at a very high rotation speed). Combustion irregularities taking place when the internal combustion engine has a very low rotation speed generate torque/speed oscillations that are sometimes amplified by resonance phenomena that can lead to a mechanical noise (often identified with the expression "cobbled sound") that can perceived by the driver (also because there are no other noises that can "cover", since the road vehicle is standing still and the internal combustion engine has a very low rotation speed).

Patent application US2011284336A1 describes a method to reduce the noise generated in the drivetrain of a motor vehicle when in neutral, in particular when the transmission shaft is connected to the drive shaft by means of a spline connection having a certain clearance.

DESCRIPTION OF THE INVENTION

The object of the invention is to provide a method to control a road vehicle provided with a dual-clutch, servo-assisted transmission and standing still with the internal combustion engine turned on, said method avoiding the generation of the mechanical noise described above and, at the same time, being easy and economic to be implemented.

According to the invention there is provided a method to control a road vehicle provided with a dual-clutch, servo-assisted transmission and standing still with the internal combustion engine turned on, according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
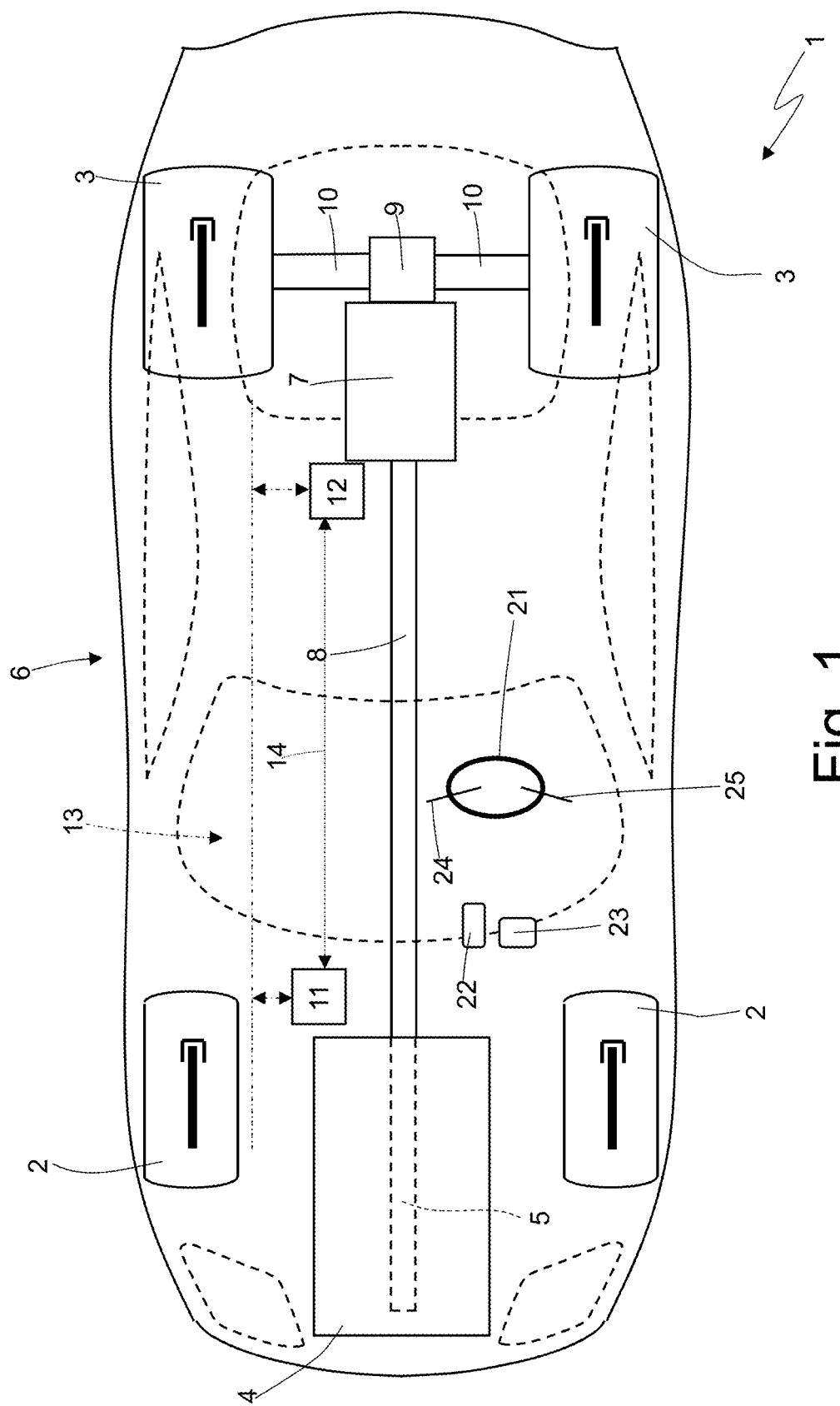
FIG. 1 is a schematic plan view of a rear-wheel drive road vehicle provided with a drivetrain with a dual-clutch, servo-assisted transmission, which is controlled according to the control method of the invention.

In FIG. 1, number 1 indicates, as a whole, a road vehicle (in particular, a car) provided with two front driven (namely, non-drive) wheels 2 and with two rear drive wheels 3. In a front position there is an internal combustion engine 4, which is provided with a drive shaft 5, which produces a torque, which is transmitted to the drive wheels 3 by means of a drivetrain 6. The drivetrain 6 comprises a dual-clutch, servo-assisted transmission 7 arranged in the rear-wheel-drive assembly and a transmission shaft 8, which connects the drive shaft 5 to an input of the dual-clutch, servo-assisted transmission 7. The dual-clutch, servo-assisted transmission 7 is connected, in a train-like manner, to a self-locking differential 9, from which a pair of axle shafts 10 start, each integral to a drive wheel 3.

The road vehicle 1 comprises a control unit 11 of the engine 4, which controls the engine 4, a control unit 12 of the drivetrain 6, which controls the drivetrain 6, and a BUS line 13, which is manufactured, for example, according to the CAN (Car Area Network) protocol, extends to the entire road vehicle 1 and allows the two control units 11 and 12 to communicate with one another. In other words, the control unit 11 of the engine 4 and the control unit 12 of the drivetrain 6 are connected to the BUS line 13 and, therefore, can communicate with one another by means of messages sent through the BUS line 13. Furthermore, the control unit 11 of the engine 4 and the control unit 12 of the drivetrain 6 can be directly connected to one another by means of a dedicated synchronization cable 14, which is capable of directly transmitting a signal from the control unit 12 of the drivetrain 6 to the control unit 11 of the engine 4 without the delays caused by the BUS line 13. Alternatively, the synchronization cable 14 could be absent and all communications between the two control units 11 and 12 could be exchanged using the BUS line 13.

Figure 2:
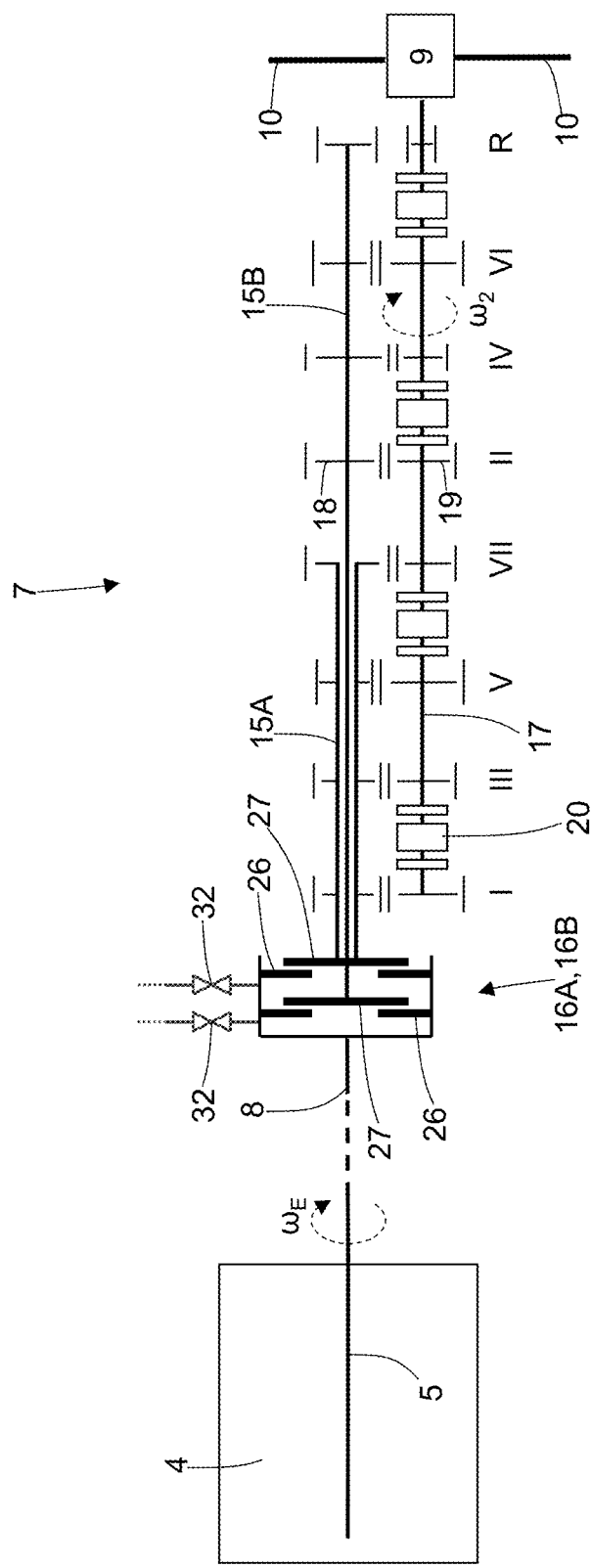
FIG. 2 is a schematic view of the drivetrain of FIG. 1.

According to FIG. 2, the dual-clutch, servo-assisted transmission 7 comprises a pair of primary shafts 15, which are coaxial to one another, independent of one another and inserted inside one another. Furthermore, the dual-clutch, servo-assisted transmission 7 comprises two coaxial clutches 16, each designed to connect a respective primary shaft 15 to the drive shaft 5 of the internal combustion engine 4 through the interposition of the transmission shaft 8; each clutch 16 is an oil bath clutch and, hence, is pressure-controlled (i.e. the degree of opening/closing of the clutch 16 is determined by the pressure of the oil inside the clutch 16); according to an alternative embodiment, each clutch 16 is a dry clutch and, hence, is position-controlled (i.e. the degree of opening/closing of the clutch 16 is determined by the position of a movable element of the clutch 16). The dual-clutch, servo-assisted transmission 7 comprises one single secondary shaft 17 connected to the differential 9 that transmits the motion to the drive wheels 3; according to an alternative and equivalent embodiment, the dual-clutch, servo-assisted transmission 7 comprises two secondary shafts 17, both connected to the differential 9.

The dual-clutch, servo-assisted transmission 7 has seven forward gears indicated with Roman numerals (first gear I, second gear II, third gear III, fourth gear IV, fifth gear V, sixth gear VI and seventh gear VII) and a reverse gear (indicated with R). The primary shaft 15 and the secondary shaft 17 are mechanically coupled to one another by a plurality of gear trains, each defining a respective gear and comprising a primary gear wheel 18 fitted on the primary shaft 15 and a secondary gear wheel 19 fitted on the secondary shaft 17. In order to allow for a correct operation of the dual-clutch, servo-assisted transmission 7, all odd gears (first gear I, third gear III, fifth gear V, seventh gear VII) are coupled to a same primary shaft 15, whereas all even gears (second gear II, fourth gear IV and sixth gear VI) are coupled to the other primary shaft 15.

Each primary gear wheel 18 is splined to a respective primary shaft 15, so as to always rotate with the primary shaft 15 in an integral manner, and permanently meshes with the respective secondary gear wheel 19; on the other hand, each secondary gear wheel 19 is mounted on the secondary shaft 17 in an idle manner. Furthermore, the dual-clutch, servo-assisted transmission 7 comprises four synchronizers 20, each mounted coaxial to the secondary shaft 17, arranged between two secondary gear wheels 19 and designed to be operated so as to alternatively fit the two respective secondary gear wheels 19 to the secondary shaft 17 (i.e. so as to alternatively cause the two respective secondary gear wheels 19 to become angularly integral to the secondary shaft 17). In other words, each synchronizer 20 can be moved in one direction to fit a secondary gear wheel 19 to the secondary shaft 17 or can be moved in the other direction to fit the other secondary gear wheel 19 to the secondary shaft 17.

The dual-clutch transmission 7 comprises one single secondary shaft 17 connected to the differential 9 that transmits the motion to the drive wheels 3; according to an alternative and equivalent embodiment, the dual-clutch transmission 7 comprises two secondary shafts 17, both connected to the differential 9.

According to FIG. 1, the road vehicle 1 comprises a passenger compartment housing a driving position for the driver; the driving position comprises a seat (which is not shown), a steering wheel 21, an accelerator pedal 22, a brake pedal 23 and two paddle shifters 24 and 25, which control the dual-clutch, servo-assisted transmission 7 and are connected to the opposite sides of the steering wheel 21. The upshift paddle shifter 24 is operated by the driver (by means of a short pressure) in order to request an upshift (namely, the engagement of a new gear, which is higher than the current gear and contiguous with the current gear), whereas the downshift paddle shifter 25 is operated by the driver (by means of short pressure) in order to request a downshift (namely, the engagement of a new gear, which is lower than the current gear and is contiguous with the current gear).

Figure 3:
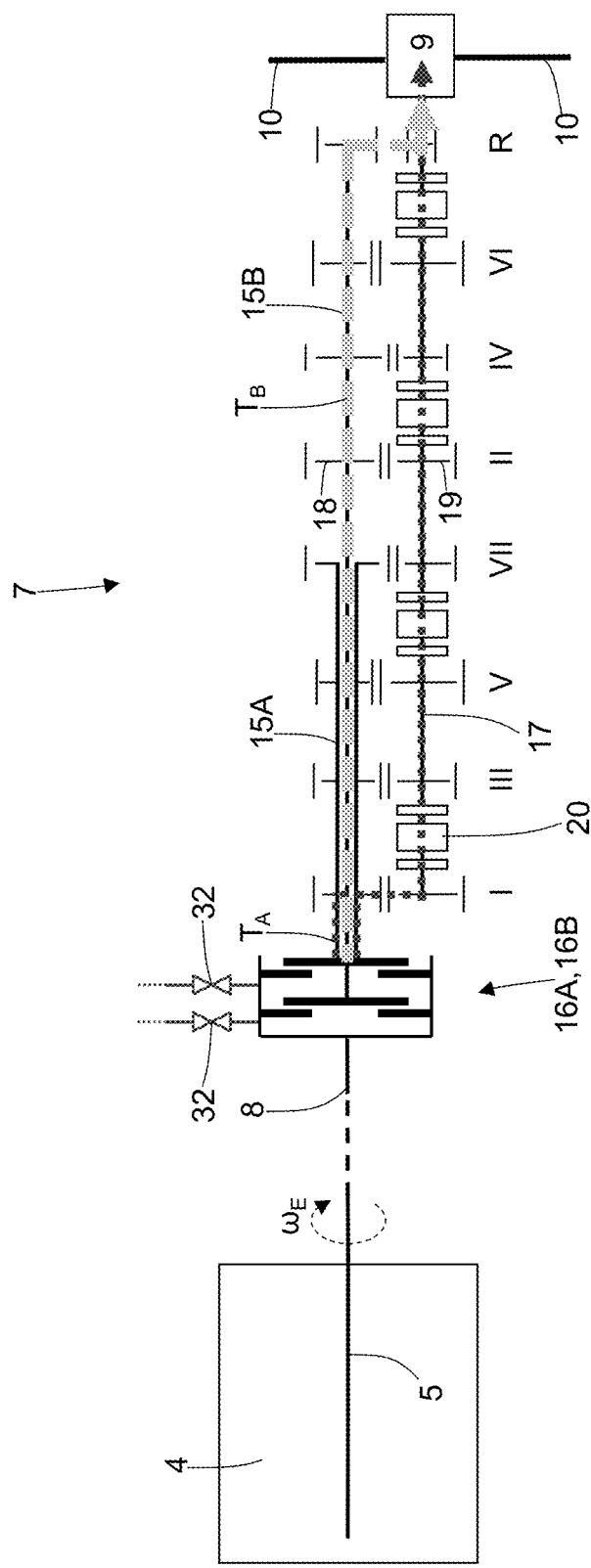
FIG. 3 is a schematic view of the drivetrain of FIG. 1, highlighting the path of two distinct torques transmitted by the two clutches.

In use, the control unit 12 of the drivetrain 6 detects when the road vehicle 1 is standing still with the internal combustion engine 4 turned on and, in this condition (and only in this condition), the control unit 12 of the drivetrain 6 engages a forward gear (normally the first gear I) that is associated with the clutch 16A (associated with all odd gears), engages the reverse gear R associated with the clutch 16B (associated with all even gears), which is different from and independent of the clutch 16A; subsequently, like FIG. 3 schematically shows, when the road vehicle 1 is standing still with the internal combustion engine 4 turned on, the control unit 12 of the drivetrain 6 closes the clutch 16A so as to cause the clutch 16A to transmit a torque $T_A$ and closes the clutch 16B so as to cause the clutch 16B to transmit a torque $T_B$, which is equal to the torque $T_A$ multiplied by the quotient between a gear ratio of the reverse gear R and a gear ratio of the forward gear (namely, of the first gear I). In this way, the secondary shaft 17 of the transmission 7 is subjected, as a whole, to a zero torque, since, in the secondary shaft 17, the two torques $T_A$ and $T_B$ have the same absolute values and opposite directions so that, therefore, they cancel one another out.

By way of example, the torque $T_A$ ranges from 3 to 7 Nm, namely the torque $T_A$ ranges from 0.4% to 0.9% of a maximum torque of the internal combustion engine 4; as a consequence, the torque $T_A$ (and also the torque $T_B$, which is similar to the torque $T_A$, since the gear ratio of the reverse gear R is similar to the gear ratio of the first gear I) is very small. Indeed, the function of the torques $T_A$ and $T_B$ transmitted by the two clutches 16A and 16B is not that of moving the road vehicle 1 (which, instead, must remain still), but is that of closing the different mechanical clearances, thus allowing the drivetrain 6 to avoid the generation of the mechanical noises. Furthermore, the moderate increase in the torque to be generated by the internal combustion engine 4 in order to continue idling moves the engine point to more favourable work conditions, which decrease combustion irregularities and, hence, decrease those mechanical stresses that can produce mechanical noises.

It is evident that, in these conditions, both clutches 16A and 16B operate in slip mode, since, in each clutch, a driving disc 26 (which is schematically shown in FIG. 2) rotates at the same rotation speed $\omega_E$ as the internal combustion engine 4 and a driven disc 27 (which is schematically shown in FIG. 2) is still (since the road vehicle 1 must remain still). However, since the rotation speed $\omega_E$ of the internal combustion engine 4 is moderate (the internal combustion engine 4 idles) and the torques $T_A$ and $T_B$ transmitted by the two clutches 16A and 16B are small, the heat dissipation taking place in the clutches 16A and 16B due to the slip mode is modest and not significant.

Figure 4:
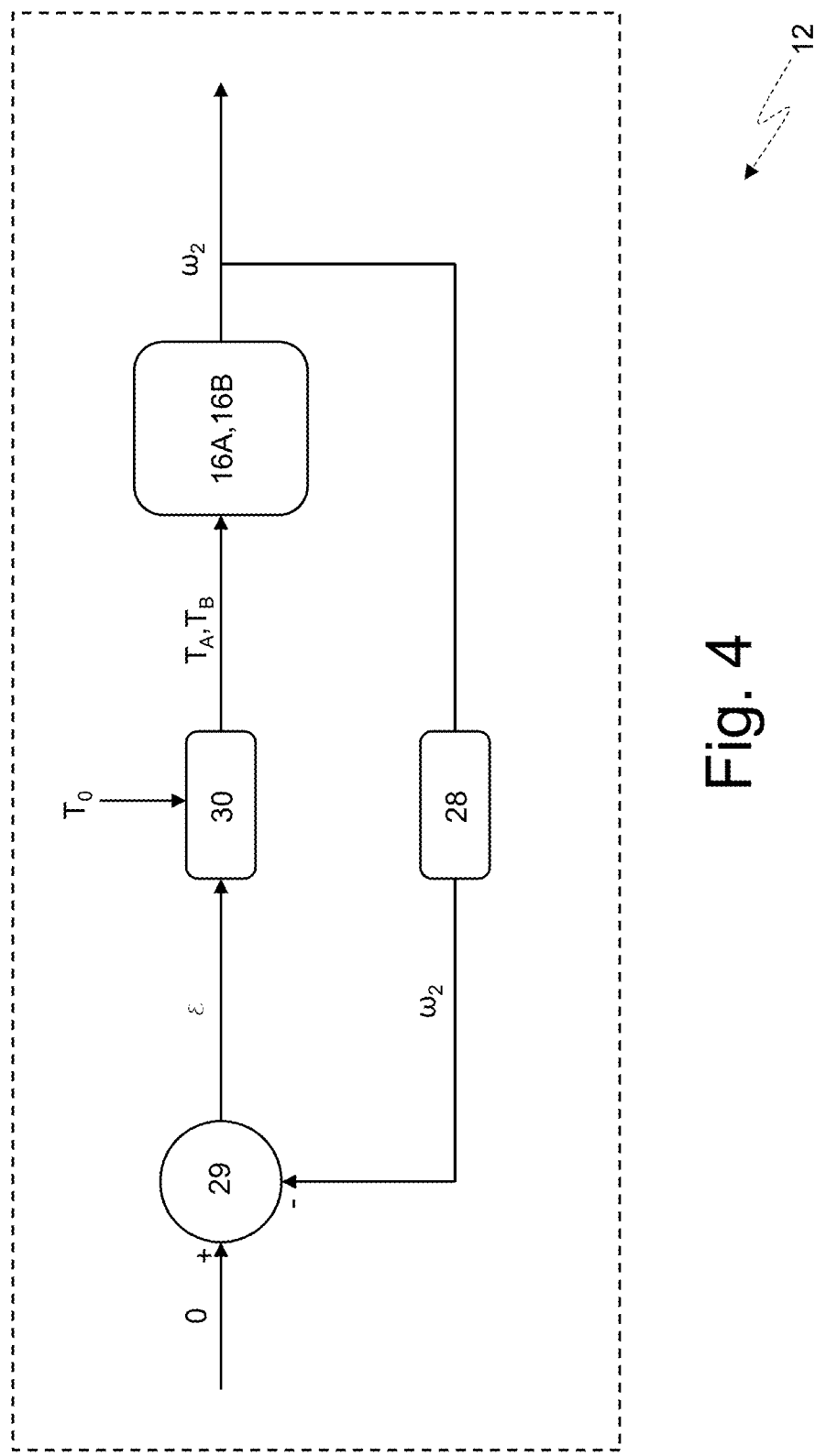
FIG. 4 is a block diagram of a control logic implemented in a control unit of the drivetrain.

According to a preferred embodiment schematically shown in FIG. 4, the control unit 12 of the drivetrain 6 detects a rotation speed $\omega_2$ of a secondary shaft 17 of the transmission 7 (for example by means of a sensor 28, which is directly or indirectly connected to the secondary shaft 17 of the transmission 7) and modulates the torque $T_A$ and/or the torque $T_B$ based on the rotation speed $\omega_2$ of the secondary shaft 17 of the transmission 7 and so as to cause the rotation speed $\omega_2$ of the secondary shaft 17 of the transmission 7 to remain zero. In other words, the control unit 12 of the drivetrain 6 modulates the torque $T_A$ and/or the torque $T_B$ so as to cause the rotation speed $\omega_2$ of the secondary shaft 17 of the transmission 7 to become (and remain) zero (since, as already mentioned above, the road vehicle 1 does not need to move).

According to a preferred embodiment shown in FIG. 4, the control unit 12 of the drivetrain 6 implements a feedback control to modulate the torque $T_A$ and/or the torque $T_B$; in the feedback control, the control error $\varepsilon$ is equal to the difference between zero (which represents the target value) and the rotation speed $\omega_2$ of the secondary shaft 17 of the transmission 7. In particular, the feedback control entails the use of a subtracter block 29, which calculates the control error $\varepsilon$ by determining the difference between zero (which represents the target value) and the rotation speed $\omega_2$ of the secondary shaft 17 of the transmission 7, and also entails the use of a PID controller 30, which receives, as an input, the control error $\varepsilon$ and produces, as an output, the torque $T_A$ and the torque $T_B$ with which to control the clutch 16A and the clutch 16B, respectively.

The PID controller 30 also receives an initial torque $T_0$ (other than zero) and, at first, the torque $T_A$ is assumed to be equal to the initial torque $T_0$ (the torque $T_B$ is calculated accordingly depending on the gear ratios of the gears involved); subsequently and if necessary, the PID controller 30 changes the value of the torque $T_A$ (initially equal to the value of the initial torque $T_0$) and/or the value of the torque $T_B$ (initially derived from the value of the initial torque $T_0$ through the gear ratios of the gears involved) based on the control error $\varepsilon$. If the control error $\varepsilon$ always is (substantially) zero, then the value of the torque $T_A$ remains equal to the value of the initial torque $T_0$ and the value of the torque $T_B$ remains derived from the value of the initial torque $T_0$ (through the gear ratios of the gears involved).

According to a preferred embodiment, when the rotation speed $\omega_2$ of the secondary shaft 17 of the transmission 7 is not zero, the torque $T_A$ or $T_B$ acting in the same direction as the rotation speed $\omega_2$ of the secondary shaft 17 of the transmission 7 is decreased (rather than increasing the torque $T_A$ or $T_B$ acting in an opposite direction relative to the rotation speed $\omega_2$ of the secondary shaft 17 of the transmission 7); in this way, the torques $T_A$ and $T_B$, which always have to remain small, are prevented from excessively increasing.

According to a preferred embodiment, the control unit 12 of the drivetrain 6 opens both clutches 16A and 16B if the rotation speed $\omega_2$ of the secondary shaft 17 of the transmission 7 exceeds, in absolute value, a safety threshold, since it is preferable to have a mechanical noise rather than causing a movement of the road vehicle 1 that can be perceived by the driver (who, on the contrary, expects the road vehicle 1 to remain still).

The control modes described above with reference to the rotation speed $\omega_2$ of the secondary shaft 17 of the transmission 7 can be implemented, as an alternative, not using the rotation speed $\omega_2$ of the secondary shaft 17 of the transmission 7, but using, instead of that, the angular position of the secondary shaft 17 of the transmission 7 (which is the time integral of the rotation speed $\omega_2$ of the secondary shaft 17 of the transmission 7 and, hence, simply is the rotation speed $\omega_2$ of the secondary shaft 17 of the transmission 7 in another form, namely is a transform of the rotation speed $\omega_2$ of the secondary shaft 17 of the transmission 7).

According to a preferred embodiment, the control unit 12 of the drivetrain 6 opens both clutches 16A and 16B if a door of the road vehicle 1 is opened, since, due to evident personal safety reasons, when someone is getting into or out of the road vehicle 1, there has to be no possibility at all that the road vehicle 1 moves.

According to a preferred embodiment, the control unit 12 of the drivetrain 6, cyclically and after a given amount of time (for example 20-30 seconds) has elapsed since the closing of the clutches 16A and 16B, opens for some instants (for example less than a second) both clutches 16A and 16B, quickly and repeatedly opens and closes, when both clutches 16A and 16B are open, control valves 32 controlling the feeding of oil to the clutches 16A and 16B, so as to clean the control valves 32, and finally closes the clutches 16A and 16B again after having cleaned the control valves 32. Indeed, when the control valves 32 remain almost closed for a long time (namely, when they remain half-open, which is necessary when the clutches 16A and 16B transmit very small torques $T_A$ and $T_B$), due to physiological impurities of the oil, there can be pressure oscillations, which make it difficult for the torques $T_A$ and $T_B$ transmitted by the clutches 16A and 16B to be controlled in a precise manner; this drawback can be solved by cleaning the control valves 32 by means of a shake of the control valves 32. In other words, the half-closed position of the control valves 32, if it lasts for a long time, can cause the control valves 32 to block or jam; therefore, at regular time intervals, the control valves 32 are shaken so as to ensure that they can be controlled.

The embodiments described herein can be combined with one another, without for this reason going beyond the scope of protection of the invention.

The control method described above has different advantages.

First of all, the control method described above avoids the generation of a mechanical noise (often identified with the expression "cobbled sound") that can be perceived by the driver when the road vehicle 1 is standing still with the internal combustion engine 4 turned on. This result is obtained thanks to the fact that the entire drivetrain 6 downstream of the clutches 16A and 16B is subjected to the torques $T_A$ and $T_B$ transmitted by the clutches 16A and 16B, thus making up for all mechanical clearances.

Furthermore, the control method described above is easy and economic to be implemented as its execution requires a limited memory space and a reduced calculation ability.

LIST OF THE REFERENCE NUMBERS OF THE FIGURES 1 road vehicle
2 front wheels
3 rear wheels
4 engine
5 drive shaft
6 drivetrain
7 transmission
8 transmission shaft
9 differential
10 axle shafts
11 engine control unit
12 drivetrain control unit
13 BUS line
14 synchronization cable
15 primary shafts
16 clutches
17 secondary shaft
18 primary gear wheel
19 secondary gear wheel
20 synchronizers 21 steering wheel
22 accelerator pedal
23 brake pedal
24 upshift paddle shifter
25 downshift paddle shifter
26 driving disc
27 driven disc
28 sensor
29 subtracter block
30 PID controlled
31 calculation block
32 control valves
$\omega_E$ rotation speed
$\omega_2$ rotation speed
$T_0$ initial torque
$T_A$ torque
$T_B$ torque
$\varepsilon$ control error

The invention claimed is:

1. A method to control a road vehicle (1) provided with a dual-clutch, servo-assisted transmission (7) and standing still with an internal combustion engine (4) turned on; the control method comprises, when the road vehicle (1) is standing still with the internal combustion engine (4) turned on, the steps of:
engaging a forward gear associated with a first clutch (16A);
engaging a reverse gear (R) associated with a second clutch (16B), which is different from and independent of the first clutch (16A);
closing the first clutch (16A) so as to cause the first clutch (16A) to transmit a first torque ($T_A$);
closing the second clutch (16B) so as to cause the second clutch (16B) to transmit a second torque ($T_B$), which is equal to the first torque ($T_A$) multiplied by the quotient between a gear ratio of the reverse gear (R) and a gear ratio of the forward gear;
detecting a rotation speed ($\omega_2$) of a secondary shaft (17) of the transmission (7); and
modulating the first torque ($T_A$) and/or the second torque ($T_B$) depending on the rotation speed ($\omega_2$) of the secondary shaft (17) of the transmission (7).

2. The control method according to claim 1, wherein the first torque ($T_A$) ranges from 3 to 7 Nm.

3. The control method according to claim 1, wherein the first torque ($T_A$) ranges from 0.4% to 0.9% of a maximum torque of the internal combustion engine (4).

4. The control method according to claim 1, wherein both clutches (16A, 16B) operate in slip mode, as, in each clutch, a driving disc (26) rotates at the same rotation speed ($\omega_E$) as the internal combustion engine (4) and a driven disc (27) is still.

5. The control method according to claim 1, wherein the rotation speed ($\omega_2$) of the secondary shaft (17) of the transmission (7) is measured by a sensor (28) connected to the secondary shaft (17).

6. The control method according to claim 1, wherein the first torque ($T_A$) and/or the second torque ($T_B$) are modulated so as to cause the rotation speed ($\omega_2$) of the secondary shaft (17) of the transmission (7) to be zero.

7. The control method according to claim 6, wherein the first torque ($T_A$) and/or the second torque ($T_B$) are modulated by means of a feedback control in which a control error ($\varepsilon$) is the difference between zero and the rotation speed ($\omega_2$) of the secondary shaft (17) of the transmission (7).

8. The control method according to claim 7, wherein the first torque ($T_A$) and/or the second torque ($T_B$) are modulated by a PID controller (30) which receives, as an input, the control error ($\varepsilon$).

9. The control method according to claim 1, wherein, when the rotation speed ($\omega_2$) of the secondary shaft (17) of the transmission (7) is not zero, the torque ($T_A$, $T_B$) acting in the same direction as the rotation speed ($\omega_2$) of the secondary shaft (17) of the transmission (7) is decreased.

10. The control method according to claim 1, wherein, if the rotation speed ($\omega_2$) of the secondary shaft (17) of the transmission (7) exceeds, in absolute value, a safety threshold, both clutches (16A, 16B) are opened.

11. The control method according to claim 1, wherein, if a door of the road vehicle (1) is opened, both clutches (16A, 16B) are opened.

12. The control method according to claim 1 and comprising, cyclically and after a given amount of time has elapsed since the closing of the clutches (16A, 16B), the further steps of:
opening both clutches (16A, 16B);
quickly and repeatedly opening and closing, when both clutches (16A, 16B) are open, control valves (32) controlling the feeding of oil to the clutches (16A, 16B), so as to clean the control valves (32); and
closing the clutches (16A, 16B) again after having cleaned the control valves (32).

* * * * *